United States Patent [19]

Gentiluomo

[11] 4,404,888
[45] Sep. 20, 1983

[54] OBTURATOR SYSTEM

[75] Inventor: Joseph A. Gentiluomo, Schenectady, N.Y.

[73] Assignee: The United States of America as represented by the Secretary of the Army, Washington, D.C.

[21] Appl. No.: 310,944

[22] Filed: Oct. 13, 1981

[51] Int. Cl.³ .................................... F41F 11/00
[52] U.S. Cl. .................................... 89/26
[58] Field of Search ............................ 89/26

[56] References Cited

U.S. PATENT DOCUMENTS 270,299  1/1883  Freyre ............................ 89/26
466,320  1/1892  Benet ............................. 89/26

Primary Examiner—Stephen C. Bentley
Attorney, Agent, or Firm—Robert P. Gibson; Anthony T. Lane; Robert O. Richardson

[57] ABSTRACT

This invention pertains to an obturator system used in large caliber weapons, such as cannons, for the purpose of preventing high pressure and temperature gases from propellant charges to escape rearward through the breech. The sealing system consists of a spindle having a mushroom shaped head integral with a shaft portion, a metallic seal ring, and a disc spring. The shaft of the spindle passes through the breechblock such that the conical wedging surface of the mushroom head contacts the interior conical surface of the seal ring. The external conical surface of the metallic seal ring contacts the chamber gas check seat, and the base of the seal ring contacts the top surface of the disc spring which in turn rests against the front face of the breechblock. The function of the disc spring is to provide sufficient force at the base of the seal ring to establish proper initial sealing between the mushroom head wedge surface, the chamber gas check seat, and the conical surfaces of the seal ring when the breech is closed. During the firing cycle, the propellant gas pressure forces the mushroom head rearward to dilate the metallic seal ring against the gas check seat to effectuate a tight seal, and prevent any rearward escape of propellant gases.

6 Claims, 3 Drawing Figures

Fig._1_

OBTURATOR SYSTEM

BACKGROUND OF THE INVENTION

This invention pertains to the field of weapons, and more particularly to cannon chamber propellant gases sealing systems.

Since the introduction of breech loaded weapons requiring the use of separate loaded ammunition, obturation difficulties have been experienced because of the broad range of environmental conditions encounted by said weapons. The obturation system in general use by the U.S. Army is the DeBange system invented in 1876. It is used in all bag loaded artillary, and with minor deviations is basically the same as when invented.

Weapons using bag-loaded ammunition must be provided at the breech with a sealing means that will prevent propellant gases from passing to the rear into the threads or other parts of the breech mechanism. Should leakage paths exist, gases will be forced through said path openings at great velocity due to high chamber pressure. Said gas velocity along with high temperature gives the gases great erosive power such that threads and other parts of the breech mechanism, along with the gas check seat, can be ruined.

Presently used obturator systems utilize a non-metallic elastic pad in conjunction with annular steel split rings to protect the front and rear edges of said pad from being burned by the propellant gases. Said obturation systems do not perform satisfactory under the required operating ambient temperature range. At low temperatures, the elastic sealing pads shrink excessively when compared to the surrounding metal to cause leakage. At high temperatures, said elastic pads expand such as to cause hard closing of the breech. Further problems encounted relate to the relatively short useful life of both pads and steel split rings, and the high cost of manufacture.

SUMMARY OF THE INVENTION

The intent of this invention is to overcome the deficiencies of presently used obturation systems. This is accomplished by providing a completely metallic obturation system wherein the coefficient of thermal expansion of obturation system components and surrounding breech mechanism components, are substantially the same. The obturator sealing system of the instant invention consists of a spindle having a mushroom shaped head integral with a shaft portion, a metallic seal ring, and a disc spring. The shaft of the spindle passes through the breechlock such that the conical wedging surface of said mushroom head contacts the interior conical surface of the seal ring. The external conical surface of the mushroom head contacts the chamber gas check seat, and the base of the seal ring contacts the top surface of the disc spring which in turn rests against the front face of the breechblock. The function of the disc spring is to provide sufficient force at the base of the seal ring to establish proper initial sealing between the mushroom head wedge surface, the chamber gas check seat, and the conical surfaces of the seal ring, when the breech is in the closed position. During the firing cycle, the propellant gas pressure forces the mushroom head rearward to dilate the metallic seal ring into sealing contact with the gas check seat, to prevent the rearward escape of propellent gases. Should galling occur between the mushroom head's wedge surface and the inner conical surface of the seal ring, said wedge surface can be coated or plated with a galling resistant material that developes low adhesive force with the surface material of said seal ring. It should be noted that the sealing ring of the instant invention accomplishes its sealing function through directly induced circumferential stretching of the seal ring to contact the gas check seat, whereas the DeBange system attains sealing through elastic pad compression to cause radial bulging of said pad's out circumferential surface against the gas check seat. Further comparison will reveal that the two outer split rings, the elastic pad, and the inner ring of the DeBange system are replaced by a single metallic seal ring in the instant invention.

To emphasize additional advantages of the instant invention over prior art, the following objects of the invention are presented:

To provide an obturator system capable of operating effectively at pressures approaching 100,000 pounds per square inch.

To provide an obturator system having substantially greater operating life.

To provide an obturator system that requires only one metallic seal ring to provide proper sealing throughout the required operating range.

To provide an obturator system that is more reliable.

To provide an obturator system that can be manufactured at substantial cost savings.

To provide an obturator system having a metallic seal ring that has infinite storage life.

To provide an obturator system that can withstand rough handling. The above objects and other objects of the invention will become more fully understood when taken in conjunction with the following detailed description and the accompanying drawings, of which:

DESCRIPTION OF THE INVENTION

Figure 1:
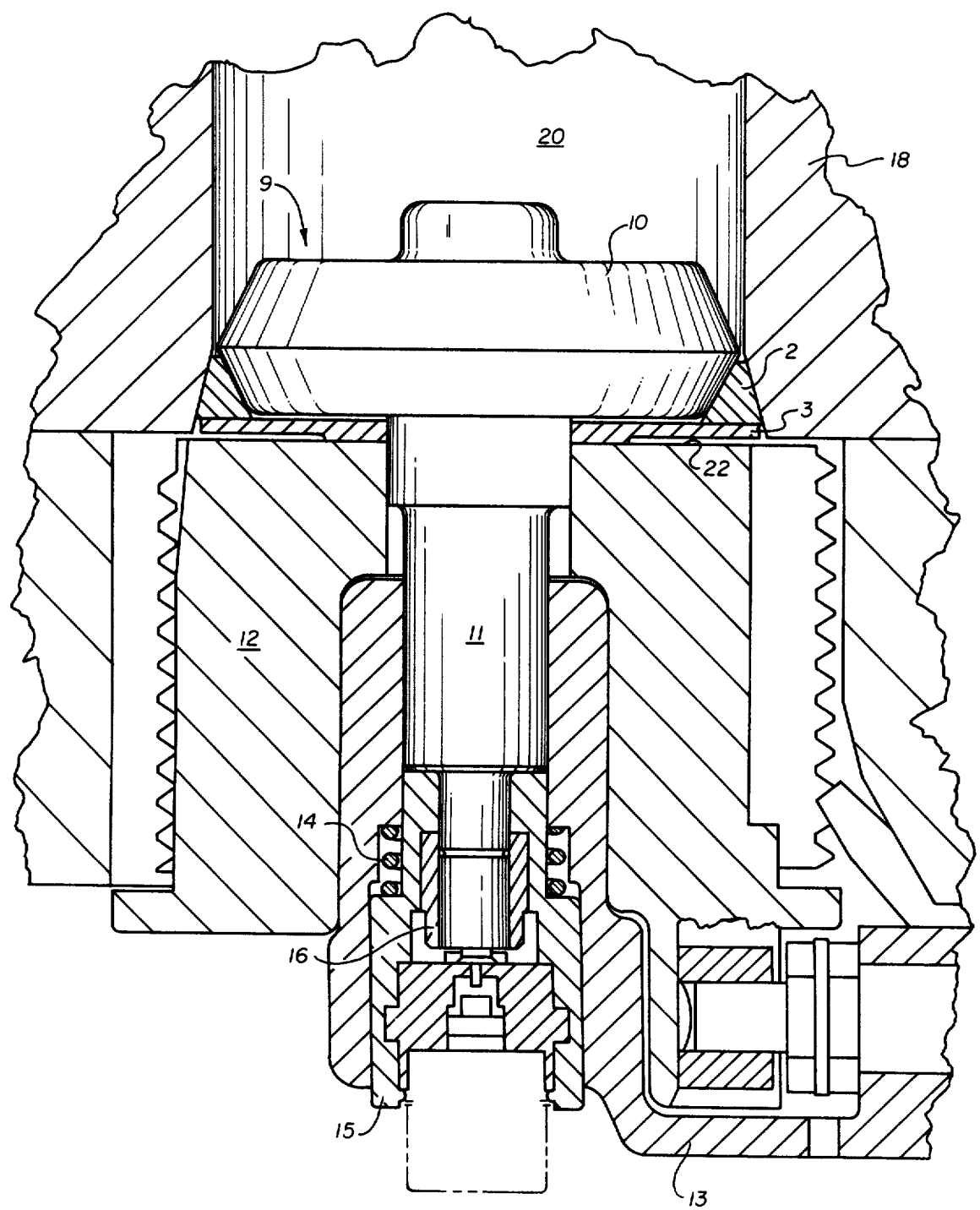
FIG. 1 is a cross sectional view of the obturator system disposed relative to the breech mechanism and tube.
Figure 2:
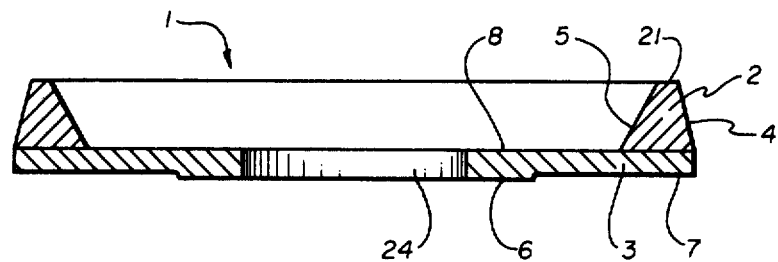
FIG. 2 is a cross sectional view of the seal ring assembly.
Figure 3:
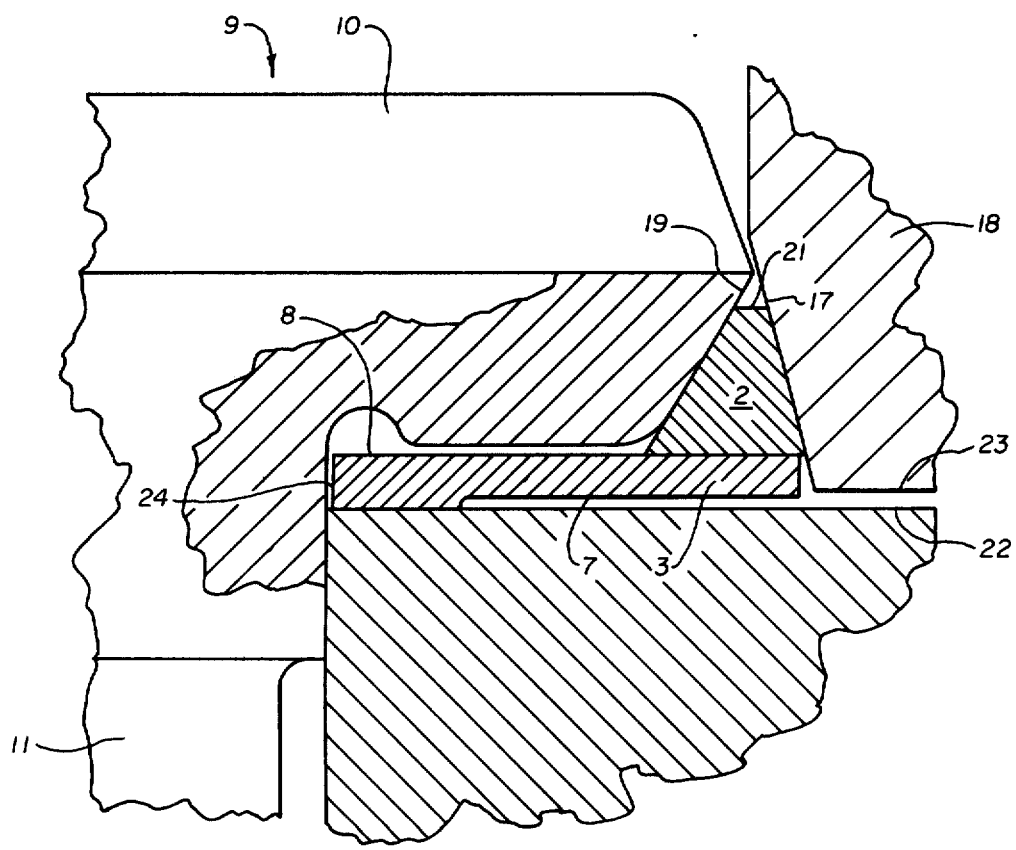
FIG. 3 is a partial view of the obturator system disposed relative to the breech mechanism and tube.

With reference to FIGS. 1, 2, and 3, seal ring assembly (1) consists of annular metallic seal ring (2) and annular disc spring (3). Said seal ring (2) includes an outer conical surface (4) and an inner conical surface (5) to form a triangular cross-section. Said conical surfaces diverge toward the base of said seal ring. Since said surfaces (4) and (5) are sealing surfaces, they must have a surface finish sufficiently smooth to perform the intended function of sealing against gas flow. Said disc spring (3) has a central hole (24) to allow mounting of shaft (11) therethrough, a base surface (6), and a step-up surface (7) to allow for flexing when peripherally loaded down by action of seal ring (2). The thickness between surfaces (7) and (8) is such as to require a predetermined amount of load to flex it axially toward breech surface (22). The material used for the disc spring must have properties such a to deflect without incurring permanent set.

Use of said seal ring assembly (1) within the breech mechanism may be ascertained by referring to FIGS. 1 and 3. The obturator system consists of a spindle (9) having mushroom head (10) integral with shaft (11), and seal ring assembly (1). Said shaft (11) passes through central hole (24) of said feedstock (12). The breechblock is in turn rotatably mounted upon carrier assembly (13). Said mushroom head (10) along with integral shaft (11) can be moved longitudinally within said carrier assembly (13), but cannot rotate therein. A helical compression spring (14) is located in the recess of said carrier assembly (13) and around housing assembly (15). Said housing assembly (15) is in turn secured with respect to shaft (11) by means of nut (16) to thus retain said obturator assembly within said carrier assembly (13). The function of said compression spring (14) is to provide the force required to firmly hold seal ring assembly (1) between mushroom head (10) and the front face of said breechblock (12). It should be noted that the breechblock may rotate independent of said obturator system, so that in closing the breech the rotation of said breechblock (12) will advance it inward to wedge the outer conical surface (4) of said seal ring (2) against the gas check seat (17) of tube (18). During said closing, the bottom bearing surface (6) of said disc spring (3) will slip relative to the front face of said breechblock (12). In opening of said breech, the reverse action will prevail. That is slipping will not occur at said outer surface (4) and inner surface (5) of said seal ring (2), but will prevail between said base surface (6) and the front face of said breechblock.

With the breech in the open position, the conical wedging surface (19) of said mushroom head (10) will bear against conical surface (5) of said seal ring (2) through action of helical compression spring (14), to effectuate sealing therebetween. When the breech is closed, the outer conical surface (4) of said seal ring (2) will bear against gas check seat (17). In so doing, said seal ring (2) will force disc spring (3) to deflect axially toward the breechblock while maintaining contact with said surface (17). When the weapon is fired, gas pressure within powder chamber (20) will act upon annulus cap (21) to further displace said seal ring (2) and disc spring (3) axially toward breechblock face (22). Simultaneously, said chamber pressure will bear against mushroom head (10) to cause wedging action between wedging surface (19) and conical surface (5). Said wedging action will operate to force said seal ring (2) to dilate and maintain sealing contact between conical surface (4) and gas check seat (17), as said disc spring (3) deflects until it bottoms-out on said breechblock face (22). It is to be noted that the outer peripheral area of surface (7) will be displaced only a predetermined distance before making contact with breechblock face (22). Said predetermined distance is limited by the gap existing between surface (7) and breechblock surface (22), after breech closing. The stepped portion or the gap between surfaces (7) and (22) must be sufficient to compensate for dimensional tolerances that exist between the location of the gas check seat surface (17), and the breechblock face (22).

I claim:

1. An obturator system functionally mounted between the tube and breechblock of a cannon, comprising:
    (a) an annular disc spring mounted against the front face of said breechblock.
    (b) an annular seal ring having a base surface slidably engaged with said disc spring, an outer sealing surface oriented to align itself with said tube's gas check seat when said breechblock is in the closed position, and an inner sealing surface;
    (c) and a spindle having integral mushroom head and shaft, with said shaft slidably mounted within said breechblock, and said mushroom head having a wedging surface oriented for making slidable contact with said inner sealing surface of said seal ring.

2. The invention as defined by claim 1, wherein said annular seal ring is further characterized as having inner and outer conical sealing surfaces diverging toward said sealing ring's base surface.

3. The invention as defined by claim 2, wherein said annular seal ring is further characterized as being made of such material properties as to avoid permanent set during forced dilation.

4. The invention as defined by claim 3, wherein said disc spring is further characterized as having a stepped surface to provide a predetermined gap adjacent to said breechblock face.

5. The invention as defined by claim 4, wherein said disc spring is further characterized as being made of such material properties as to avoid permanent set during flexing.

6. The invention as defined by claim 5, wherein the wedging surface of said mushroom head is further characterized as having a coating or plating for promoting non-galling between said wedging surface and said sealing ring's inner sealing surface.

* * * * *